(12) United States Patent
Welschof

(10) Patent No.: US 6,902,487 B2
(45) Date of Patent: Jun. 7, 2005

(54) LONGITUDINAL DISPLACEMENT UNIT WITH BRAKING ROLLERS

(75) Inventor: Hans-Heinrich Welschof, Rodenbach (DE)

(73) Assignee: GKN Driveline Deutschland GmbH (DE)

( * ) Notice: Subject to any disclaimer, the term of this patent is extended or adjusted under 35 U.S.C. 154(b) by 0 days.

(21) Appl. No.: 10/627,848

(22) Filed: Jul. 25, 2003

(65) Prior Publication Data

US 2004/0214647 A1 Oct. 28, 2004

(30) Foreign Application Priority Data

Jul. 25, 2002 (DE) .......................................... 102 33 758

(51) Int. Cl.[7] .................................................. F16D 3/06
(52) U.S. Cl. ....................................................... 464/167
(58) Field of Search ................................. 464/146, 167, 464/168; 384/10, 49, 51, 52, 54

(56) References Cited

U.S. PATENT DOCUMENTS

| | | | |
|---|---|---|---|
| 2,562,729 A | * | 7/1951 | Merwin ...................... 464/167 |
| 4,705,491 A | | 11/1987 | Andersson |
| 5,026,325 A | * | 6/1991 | Welschof ..................... 464/146 |
| 5,236,264 A | * | 8/1993 | Matsubara et al. ........... 384/49 |
| 6,217,456 B1 | | 4/2001 | Jacob |
| 6,234,908 B1 | | 5/2001 | Jacob |
| 6,254,487 B1 | | 7/2001 | Jacob |
| 6,306,045 B1 | | 10/2001 | Jacob |
| 6,343,993 B1 | | 2/2002 | Duval et al. |

* cited by examiner

Primary Examiner—Greg Binda

(57) ABSTRACT

A longitudinal displacement unit for a shaft assembly includes a profiled sleeve (11) with first ball grooves (12), a profiled journal (21), second ball grooves (22), balls (31) which are arranged in groups in pairs of first and second ball grooves (11, 22), and a ball cage (41) which is positioned between the profiled sleeve (11) and the profiled journal (21) and fixes the balls (31) in their axial position relative to one another. The ball cage (41) contains elastic rolling members which are positioned between the profiled sleeve (11) and the profiled journal (21), so as to be radially pre-tensioned and which, during the transmission of torque, remain largely free from circumferential forces.

6 Claims, 3 Drawing Sheets

LONGITUDINAL DISPLACEMENT UNIT WITH BRAKING ROLLERS

TECHNICAL FIELD

The invention relates to a longitudinal displacement unit for a shaft assembly for torque transmitting purposes. The unit includes a profiled sleeve with circumferentially distributed, longitudinally extending first ball grooves, a profiled journal with circumferentially distributed, longitudinally extending second ball grooves, balls which are arranged as groups in pairs of first and second ball grooves, and a ball cage which is positioned between the profiled sleeve and the profiled journal and fixes the balls in their axial position relative to one another. The ball cage is axially displaceable between two end stops in the outer joint part and/or on the inner joint part.

BACKGROUND OF THE INVENTION

In telescopic shafts, if the profiled sleeve and the profiled journal are displaced relative to one another under torque, the balls in the inner and outer ball grooves roll substantially without any sliding friction. As a result, the balls and the ball cage with all the balls, together, cover half the relative displacement path between the two elements. The longitudinal displacement unit thus permits a low-friction change in length. At the ends of the displacement path, there are provided axial stops for the ball cage or for the balls, either in the profiled sleeve or on the profiled journal. Under normal operating conditions, the ball cage should preferably not reach the axial stops, but within the displacement region as specified by the design, it should be displaceable without stopping against any elements, thus avoiding any sliding friction of the balls in the ball grooves.

Assemblies of this type are used in torque transmitting shafts, especially in driveshafts. These assemblies, for the purpose of compensating for tolerances of the distance between the attached parts during assembly and/or for compensating for changes in distance of the attached parts, more particularly the joints, require a low-friction adjustment in length under torque loads during operation. The basic design of longitudinal displacement units of this type is known. Under operational conditions a problem occurs in that, if the longitudinal displacement unit is torque-free, vibrations, axial impacts or weight forces can cause the ball cage to move quickly against one of its axial stops. A rolling movement of the balls is not required to that end. If, subsequently, the longitudinal displacement unit is again torque-loaded and if, thereafter, longitudinal compensating movements are required, sliding movements can occur at the balls with the ball cage abutting the end stop. This increases the amount of wear and can lead to sliding plates at the balls as a result of which the function of the longitudinal displacement movement suffers considerably.

U.S. Pat. No. 4,705,491 describes a longitudinal displacement unit for a shaft assembly for torque transmitting purposes of the initially mentioned type which comprises a plurality of rows of balls arranged in a ball cage, wherein the balls of one row of balls consist of an elastic material and are positioned in their ball grooves in a pre-tensioned condition. In this embodiment, the torque capacity of the row of balls is clearly reduced. Thus, there exists a need for an improved longitudinal displacement unit having high torque capacity and improved wear characteristics through reduced sliding movement of the balls under load.

SUMMARY OF THE INVENTION

The present invention provides an improved longitudinal displacement unit wherein the ball cage, when free of torque, retains its position. In one embodiment, in addition to the torque transmitting balls, the ball cage contains rolling members which include an elastic material and which are held between the profiled sleeve and the profiled journal, so as to be able to roll. The rolling members are positioned between the profiled sleeve and the profiled journal, so as to be radially pre-tensioned and, during the transmission of torque, remain largely free from circumferential forces. There is thus generated a small amount of resistance against axial displacement at the ball cage, which resistance remains effective even if there is no torque at all and if the load is removed from the torque transmitting balls. On the other hand, the friction generated by the rollers is so low that the resistance to displacement of the longitudinal displacement unit under torque is not increased to an appreciable extent. Thus, the low-friction displacement function is substantially maintained. The elasticity of the additional rolling members should be relatively high relative to the torque transmitting balls which, in comparison, are regarded as unelastic, i.e. the additional rolling members are plastics or a similar material. The rolling ability of the additional rolling members can be provided around an axis which perpendicularly crosses the longitudinal axis of the axial displacement unit. The additional rolling members can be balls, barrel-type members or discs.

According to a first embodiment, the additional rolling members are arranged individually or in groups between the pairs of first and second ball grooves. It is not necessary for additional rolling members to be arranged everywhere between two ball grooves. For example, it is fully sufficient for two additional rolling members to be arranged at the ends of the ball regions in order to prevent self-movements of the ball cage. If the ball cage, in the usual way, is an elastic material, the additional rolling members can, in the same way, be clipped into recesses in the ball cage, just like the torque transmitting balls. It is desireable for the unit consisting of the ball cage, the torque transmitting balls and the additional rolling members to be suitable for being pre-assembled without the loss of any balls or rolling members.

In accordance with the above-mentioned embodiment, the rolling members run in, and respectively, on cylindrical faces with a large diameter of curvature between the pairs of ball grooves. Thereby, in an advantageous way, the design of the profiled sleeve and profiled journal remains completely unchanged as compared to prior art embodiments.

According to a second embodiment, the additional rolling members are arranged in additional grooves. Again, the additional rolling members can be balls, barrel-type members or discs.

If the additional rolling members are provided in the form of balls, the respective additional grooves should be shallow and comprise a large radius of curvature relative to the ball radius so that the radially pretensioned balls remain substantially torque-free when the transmission of torque commences. If torque loading occurs from the profiled sleeve to the profiled journal, with forces building up at the torque transmitting balls, only slight additional radial forces, if at all, are accommodated by the rolling members, but the freedom from torque is maintained. In this case, as in the above-mentioned case, the radially pretensioned balls can be substantially smaller than the torque transmitting balls. The same features that have been specified for the elastic balls, also substantially apply to the barrel-shaped radially pretensioned rolling members relative to their additional grooves.

If the additional rolling members are provided in the form of discs, it is possible to permit a slight tilting movement of the discs within the ball cage. In such cases, the respective additional grooves can be provided in the form of grooves with a circular cross-section, more particularly the grooves can have the same cross-section as the ball grooves for the torque transmitting balls. The tilting movement of the pretensioned discs prevents a transmission of torque if the longitudinal displacement unit is torque-loaded.

Other advantages and features of the invention will also become apparent upon reading the following detailed description and appended claims, and upon reference to the accompanying drawings.

BRIEF DESCRIPTION OF THE DRAWINGS

For a more complete understanding of this invention, reference should now be made to the embodiments illustrated in greater detail in the accompanying drawings and described below by way of examples of the invention.

In the drawings, preferred embodiments of the invention are compared to the state of the art and will be described below.

DETAILED DESCRIPTION

While the present invention is described with respect to a longitudinal plunging unit for a driveshaft, the invention may be adapted and utilized in driveshaft applications for sideshafts, propeller shafts or other torque transmitting shafts where axial plunge is desireable.

In the following description, various parameters and components are described for several embodiments. These parameters and components are included as examples and are not meant to be limiting.

Figure 1:
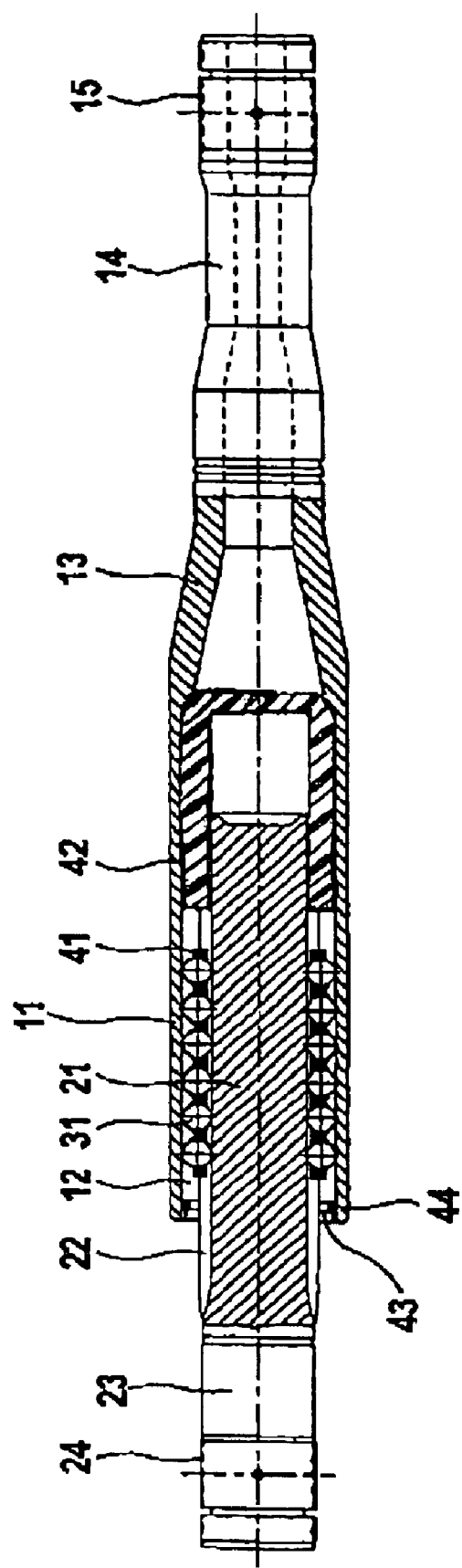
FIG. 1 shows an inventive longitudinal displacement unit for torque transmitting purposes in a longitudinal section through the torque transmitting balls.

Referring now to the drawings wherein like reference numerals are used to identify similar components in the various views, FIG. 1 shows a longitudinal displacement unit for torque transmitting purposes in a longitudinal section through the torque transmitting balls, according to the present invention.

FIG. 1 shows the unit with a profiled sleeve 11 with a constant cross-section which is axially followed by a conical portion 13 with a multiple-step profiled journal 14 with a toothing profile 15. Into the profiled sleeve 11 there is inserted a profiled journal 21 with a constant cross-section which is followed by a solid journal 23 with a toothing profile 24. The profiled sleeve 11 comprises first ball grooves 12 on its inside. The profiled journal 21 comprises second ball grooves 22 which circumferentially correspond to that of the first ball grooves 12. The number of first ball grooves 12 can be a multiple of that of the number of second ball grooves 22. The ball grooves 12, 22 which are associated with one another carry balls 31 which are arranged in groups and which are held by a sleeve-shaped ball cage 41 in identical axial arrangements relative to one another so that they cannot be lost. In the example of FIG. 1, there are six groups of balls 31 with each group including six balls 31. The groups of balls 31 are equally axially spaced, and the balls within each group are equally circumferentially spaced. The assembly could have more or fewer groups of balls as well as more or fewer balls in each group. The spacing of the balls and the groups could also vary.

Into the profiled sleeve 11 there is inserted a sleeve-shaped stop member 42 which engages the profiled grooves in a form-fitting way and forms an axial stop to prevent the profiled journal 21 from being inserted further into the profiled sleeve 11 and which, at the same time, forms a seal relative to the unmachined side towards the right. At the same time, the stop member 42 forms an axial stop for the ball cage 41 which acts very much earlier than the axial stop for the profiled journal 11.

A further axial stop for the ball cage 41 is formed by a securing ring 44 which is inserted into an annular groove 43 in the profiled sleeve 11 and which acts directly on the respective last ones of the torque transmitting balls 31. This axial stop, too, acts before the outermost extension between the profiled sleeve 11 and profiled journal 21 is reached. In the design-related displacement path, the ball cage 41—with the balls running freely—moves under torque between the stops 42, 44 without reaching these. If the longitudinal displacement unit is lengthened or shortened beyond the rolling region of the torque transmitting balls 31, the resulting sliding symptoms at the torque transmitting balls are only slight.

Subsequently, the cage 41 is again set in the center of the design-related displacement path.

Figure 2:
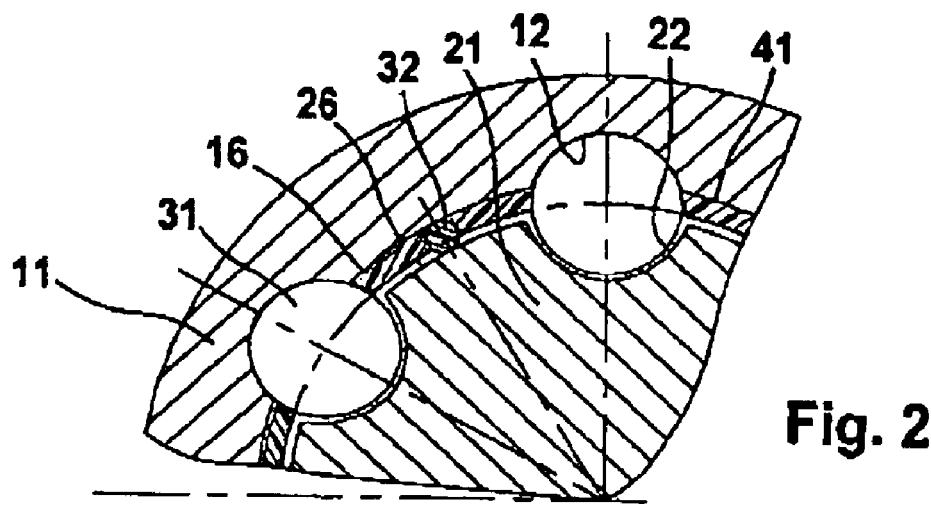
FIG. 2 shows an inventive longitudinal displacement unit according to FIG. 1 in a first embodiment in a cross-sectional view.

FIG. 2 shows a device according to FIG. 1 in a first embodiment in a cross-sectional view. It shows the profiled sleeve 11 with the first ball grooves 12, the profiled journal 21 with the second ball grooves 22 and the torque transmitting balls 31 which are positioned in pairs of ball grooves 12, 22 which are held by the ball cage 41 in the same circumferential distribution. Between each two torque transmitting balls 31, there are positioned additional balls 32 with a smaller diameter which are also clipped into recesses in the ball cage 41. The ball cage 41 can be made of an elastic material. The balls 32 are made of an elastic material and are positioned under radial pretension between the profiled sleeve 11 and the profiled journal 12, and roll on the inner cylindrical face 16 of the profiled sleeve 11 and on the outer cylindrical face 26 of the profiled journal 21. The balls 32 can also be in the form of a cylindrical rod or barrel-shaped rollers. The balls 32 can have an elasticity that is substantially greater than the elasticity of the torque-transmitting balls 31. The balls 32 run on the cylindrical faces 16, 26 which have a larger radius of curvature than the torque transmitting ball tracks 12, 22 and thus the balls 32 are relatively torque-free when torque loading occurs between the profiled sleeve 11 and profiled journal 22. That is, during torque transmission, the balls 32 remain substantially free from circumferential forces.

Figure 3:
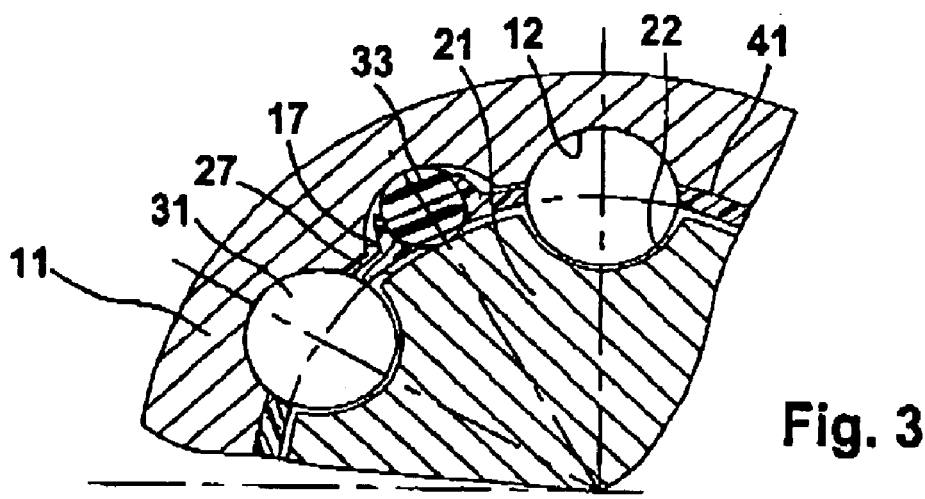
FIG. 3 shows an inventive longitudinal displacement unit according to FIG. 1 in a second embodiment in a cross-sectional view.

FIG. 3 shows a longitudinal displacement unit according to FIG. 1 in a second embodiment. Identical details have been given the same reference numbers as in FIG. 2. Between each two torque transmitting balls 31, there can be seen additional balls 33 which are made of an elastic material and which, in a radially pretensioned condition, run in additional grooves 17 in the profiled sleeve 11 and on the outer cylindrical face 27 of the profiled journal 12. As a result, when the torque transmitting balls 31 are torque-loaded, the ball members 33 are kept free from circumferential forces and do not take part in the transmission of torque. The grooves 17 have a large radius of curvature as compared to the rolling member 33 radius. Again, the rolling member 33 can be in the form of a ball, rod, or barrel-shaped roller.

Figure 4:
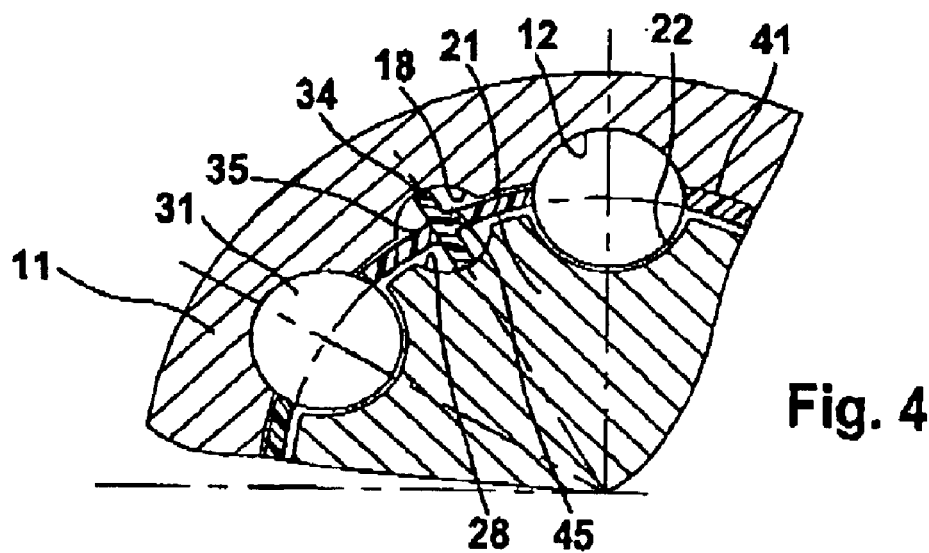
FIG. 4 shows an inventive longitudinal displacement unit according to FIG. 1 in a third embodiment in a cross-sectional view.

FIG. 4 shows a longitudinal displacement unit according to FIG. 1 in a third embodiment. Details which are identical to those shown in FIG. 2 have been given the same reference numbers. Between each two torque transmitting balls 31 in this embodiment, radially pretensioned disc members 34 made of an elastic material are inserted into the ball cage 41. The disc members 34 run in additional grooves 18, 28 which, in this case, comprise a circular cross-sectional shape similar to the first and second ball grooves 12, 22. Indeed, the grooves 18, 28 can be identical to the inner and/or outer ball grooves 12, 22. During the transmission of torque, the discs 34, because they are tiltably supported in the cage 41, are kept free from circumferential forces and thus from the transmission of torque. In other words, the discus have an oscillating axis of rotation. The discs 34 can be kept in the cage 41 by knobs 45 engaged in central spherical caps 35.

In each of the embodiments, the number and location of the rolling members 32, 33, 34 can vary. A rolling member 32, 33, 34 can be located between each two balls 31 in a group of balls, or be located only between select balls 31 within each group. For example, only two rolling members 32, 33, 34 may be desired per group of balls and the rolling members could be located circumferentially opposite each other. Also, more than one rolling member 32, 33, 34 can be located between each ball in a group of balls. Moreover, it may not be necessary to provide rolling members in each group of balls. It may be sufficient for the rolling members to be associated only with select groups of balls. For example, rolling members may be associated only with the outermost groups of balls, i.e., the groups closest to stops 42 and 43 of FIG. 1. The rolling members 32, 33, 34 can also be associated only with one or several of the groups of balls, such as the center-most group or groups of balls, or every other group of balls.

Figure 5:
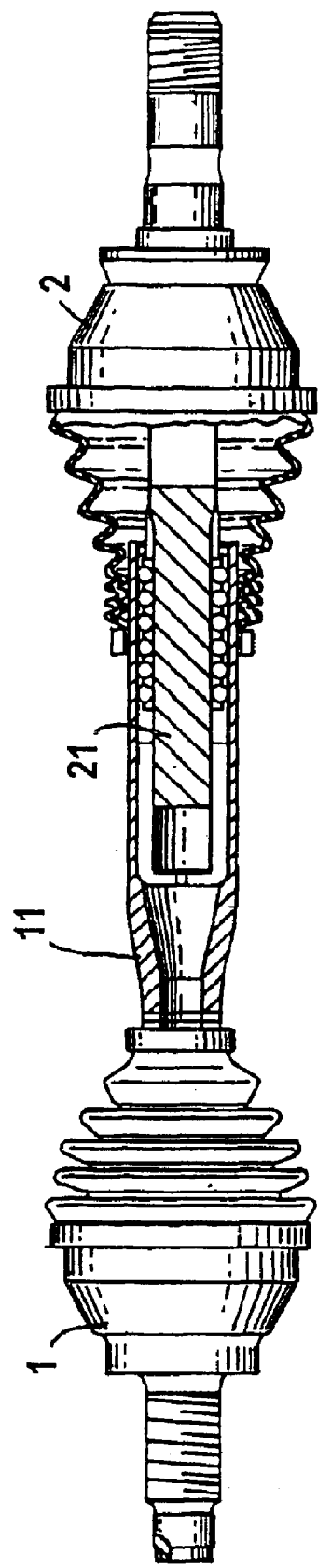
FIG. 5 shows a schematic diagram of a driveshaft with two constant velocity joints and a connecting shaft including a telescopic unit according to one embodiment of the present invention.

FIG. 5 shows one example of an application of a longitudinal displacement unit according to the present invention. FIG. 5 shows a propeller shaft having a first joint 1, a second joint 2 and a profiled sleeve 11 which connects the two joints 1, 2 for torque transmitting purposes. At least one of the first or second joints 1, 2 can be a constant velocity universal joint. A profiled journal 21 in the form a connecting shaft portion is integrated into the profiled sleeve 11. The driveshaft illustrated in FIG. 5 serves as a sideshaft, for example, for driving the wheels of a passenger car and connects the differential drive to the wheel. The changes in position occurring during compression and rebound of the wheels lead to changes in the angle of articulation of the joints 1, 2. This also leads to a change in the distance between the articulation centers of the two joints 1, 2, which changes are compensated for by the longitudinal displacement unit which permits changes in length and also be able to transmit torque.

The invention can also be applied to driveshaft embodiments other than that illustrated. For example, the longitudinal displacement unit can be used in driveshafts whose joints are not constant velocity joints, but universal joint. It can also be used in any other torque transmitting shafts where axially displacement is desired.

While the invention has been described in connection with several embodiments, it should be understood that the invention is not limited to those embodiments. Thus, the invention covers all alternatives, modifications, and equivalents as may be included in the spirit and scope of the appended claims.

What is claimed is:

1. A longitudinal displacement unit for a torque transmitting shaft assembly comprising:

a profiled sleeve (11) with circumferentially distributed, longitudinally extending first ball grooves (12);

a profiled journal (21) with circumferentially distributed, longitudinally extending second ball grooves (22);

torque-transmitting balls (31) which are arranged as groups in pairs of first and second ball grooves (11, 22);

a ball cage (41) positioned between the profiled sleeve (11) and the profiled journal (21) and fixing the balls (31) in their axial position relative to one another, wherein the ball cage (41) is axially displaceable relative to the profiled sleeve (11) between two axial stops (42, 44); and a plurality of rolling members held in the ball cage (41), so as to be able to roll, and which are radially pretensioned between the profiled sleeve (11) and the profiled journal (21), and which, during the transmission of torque, remain substantially free from circumferential forces, wherein the rolling members are balls arranged between the pairs of first and second ball grooves (12, 22) and rolling on an inner cylindrical face (16) of the profiled sleeve (11) and an outer cylindrical face (28) of the profiled journal (21).

2. A unit according to claim 1, wherein the rolling members comprise an elastic material.

3. A unit according to claim 2, wherein the ball cage (41) comprises an elastic material.

4. A unit according to claim 2, wherein the elasticity of the rolling members is substantially greater than the elasticity of the torque-transmitting balls (31).

5. A driveshaft for vehicle comprising a first rotary joint, a second rotary joint, and a longitudinal displacement unit therebetween, wherein the longitudinal displacement unit is a unit according to claim 1.

6. A driveshaft according to claim 5 wherein at least one of the first and second joints is a constant velocity universal joint.

* * * * *